United States Patent
Xu et al.

(10) Patent No.: US 11,904,270 B2
(45) Date of Patent: Feb. 20, 2024

(54) REGENERATION SYSTEM FOR CARBON-RICH AMINE SOLUTIONS AND METHOD FOR USING THE SAME

(71) Applicant: UNIVERSITY OF SCIENCE AND TECHNOLOGY OF CHINA, Anhui (CN)

(72) Inventors: Tongwen Xu, Anhui (CN); Chenxiao Jiang, Anhui (CN); Xia Chen, Anhui (CN); Rongqiang Fu, Anhui (CN); Zhaoming Liu, Anhui (CN)

(73) Assignee: UNIVERSITY OF SCIENCE AND TECHNOLOGY OF CHINA, Anhui (CN)

( * ) Notice: Subject to any disclaimer, the term of this patent is extended or adjusted under 35 U.S.C. 154(b) by 1267 days.

(21) Appl. No.: 16/260,516

(22) Filed: Jan. 29, 2019

(65) Prior Publication Data
US 2020/0038803 A1 Feb. 6, 2020

(30) Foreign Application Priority Data
Aug. 2, 2018 (CN) .......................... 201810875910.2

(51) Int. Cl.
*B01D 53/14* (2006.01)
*B01D 61/44* (2006.01)

(52) U.S. Cl.
CPC ..... *B01D 53/1406* (2013.01); *B01D 53/1425* (2013.01); *B01D 53/1475* (2013.01); (Continued)

(58) Field of Classification Search
CPC ............ B01D 53/1425; B01D 53/1475; B01D 2252/204; B01D 61/445
See application file for complete search history.

(56) References Cited

U.S. PATENT DOCUMENTS

| 5,292,407 A | 3/1994 | Roy et al. |
| 5,910,611 A | 6/1999 | Gregory, Jr. et al. |

(Continued)

FOREIGN PATENT DOCUMENTS

| CN | 103476481 A | 12/2013 | |
| CN | 105906114 A * | 8/2016 | ................ C02F 9/00 |

(Continued)

*Primary Examiner* — Salil Jain
(74) *Attorney, Agent, or Firm* — Scully, Scott, Murphy & Presser, P.C.

(57) ABSTRACT

The invention relates to a regeneration system for a carbon-rich amine solution produced in carbon dioxide capture from a mixed gas and a method for using the same. This regeneration system is composed of a bipolar membrane electrodialysis apparatus and a carbon dioxide removal apparatus, wherein the bipolar membrane electrodialysis apparatus is composed of a bipolar membrane electrodialysis membrane stack fixed between an anode plate and a cathode plate, the carbon dioxide removal apparatus is composed of one or more hollow fiber membrane contactors, the inlet of the carbon dioxide removal apparatus is fluidly connected with the outlet of the acid chamber of the bipolar membrane electrodialysis apparatus, the outlet of the carbon dioxide removal apparatus is fluidly connected with the acid solution storage tank, and carbon dioxide gas removed by the carbon dioxide removal apparatus is collected in a carbon dioxide storage tank. In the invention, by treating a carbon-rich amine solution having heat stable salts with a combined apparatus of bipolar membrane electrodialysis and carbon dioxide removal, individual operation for conventional heat stripping and organic amine regeneration is avoided, the energy consumption of carbon capture is reduced, the process flow is simplified, and the overall net capture efficiency of carbon dioxide is improved.

4 Claims, 4 Drawing Sheets

(52) U.S. Cl.
CPC ...... *B01D 61/445* (2013.01); *B01D 2251/606* (2013.01); *B01D 2252/10* (2013.01); *B01D 2252/204* (2013.01); *B01D 2252/20447* (2013.01); *B01D 2257/302* (2013.01); *B01D 2258/0283* (2013.01)

(56) References Cited

U.S. PATENT DOCUMENTS

| | | | |
|---|---|---|---|
| 9,937,471 B1 * | 4/2018 | Eisaman | B01D 61/46 |
| 10,456,749 B2 | 10/2019 | Handagama et al. | |
| 2013/0039837 A1 * | 2/2013 | Willauer | B01D 61/00 423/438 |
| 2015/0013539 A1 * | 1/2015 | Eriksen | E21B 43/36 95/178 |
| 2015/0290576 A1 * | 10/2015 | Kiguchi | B01D 61/445 204/628 |

FOREIGN PATENT DOCUMENTS

| | | | | |
|---|---|---|---|---|
| CN | 106630040 A | * | 5/2017 | |
| JP | 2012130879 A | | 7/2012 | |
| JP | 2013128899 A | | 7/2013 | |
| WO | WO-2008112253 A1 | * | 9/2008 | ........... B01D 61/422 |

* cited by examiner

REGENERATION SYSTEM FOR CARBON-RICH AMINE SOLUTIONS AND METHOD FOR USING THE SAME

TECHNICAL FIELD

The invention belongs to the field of electrically driven membrane separation, and particularly to a regeneration system for a carbon-rich amine solution and a method for using the same.

BACKGROUND ART

Capture and storage of carbon dioxide is an effective approach for controlling emission of carbon dioxide gas and reducing carbon dioxide concentration in air. Existing methods for capture and separation of carbon dioxide include a solvent absorption method, a solid adsorption method, a membrane separation method, and the like. Among these, the solvent absorption method has a relatively high absorption efficiency for carbon dioxide, meanwhile it is easy for regeneration, and thus it has been widely used. Common carbon dioxide absorption solvents include organic amines, ionic liquids, base/carbonate absorbents, and the like. Among these, organic amines and base/carbonate absorbents are the most common. In a solvent absorption method, four essential operation units are required in the process of capture and separation of carbon dioxide from flue gas: 1) a pre-absorption unit for removing acid gases such as $SO_x$, $NO_x$, HCN, and the like from the flue gas; 2) a carbon dioxide absorption unit for achieving carbon dioxide capture by using intermolecular reaction between a carbon capturing agent and carbon dioxide; 3) a heat stripping unit for destroying the reaction equilibrium between carbon dioxide and a carbon capturing agent by heating a carbon capturing solvent so as to obtain a high-purity carbon dioxide product while achieving regeneration of the carbon capturing agent; and 4) an organic amine post-treatment unit for reacting gases such as sulfur oxides, nitrogen oxides, hydrogen chloride, and the like, due to incomplete removal of these acid gases from the pre-absorption unit, with organic amines to generate heat stable organic (amine) salts. These heat stable salts will increase the viscosity of the carbon capturing agent, reduce the capture efficiency of carbon, and result in foaming of the solvent upon absorption of carbon dioxide, meanwhile they will result in degradation of the carbon capturing agent and corrosion of the equipment. Conventionally, these heat stable salts cannot be removed by a heat regeneration method, and therefore a separate organic amine treatment unit is required to remove the heat stable salts.

U.S. Pat. No. 5,910,611A has reported a method for removing heat stable salts from organic amines by using electrodialysis. The heat stable salts are converted to inorganic salts and neutral organic amines by adding a base solution to a carbon-lean amine solution, the carbon-lean amine solution is then introduced to an electrodialysis unit, and the dissociated inorganic salts are removed under the action of an electric field, while the neutral organic amines cannot be moved under the electric field and are retained. In this method, an intermittent operation is typically employed until the heat stable salts are completely removed. However, since protonated organic amines are incompletely neutralized, the loss of materials will be caused during the electrodialysis, meanwhile the intermittent operation will result in changes in the pH and ionic strength, leading to damage of the ionic membranes.

U.S. Pat. No. 5,292,407A has reported an electrodialysis apparatus using a special structure and a production method for converting heat stable salts to heat instable salts. In the process, a base solution is not required to add for neutralization so that the loss of organic amines is reduced during electrodialysis. However, since heat instable anions are typically introduced in a form of acid, the pH of the feed liquid is very low, leading to corrosion of the equipment, meanwhile heat stable anions will parasitically migrate along with heat instable anions, leading to incomplete removal of the heat stable salts.

Most of the existing studies on processes of carbon dioxide capture are focused on process optimization of an individual operation unit, instead of considering how to shorten the entire process flow for carbon capture and how to reduce the energy consumption during the organic amine regeneration and the heat stable salt removal. In view of the facts that the conventional organic amine treatment unit has disadvantages of poor removal efficiency of heat stable salts, high loss rate of organic amines, and occurrence of secondary pollution. And, the heat regeneration of a carbon capturing agent consumes a large amount of thermal energy and is an energy-intensive operation, which largely reduces the net capture efficiency of carbon dioxide. Meanwhile, an integrated operation of removal and heat stripping of heat stable salts increases the process flow of carbon capture and increase costs of operation and maintenance of the process. Based on these two problems described above, it is required to optimize and improve the existing carbon capture processes. Therefore, it is demanded in the art to propose new systems and methods for simplifying the process flow of carbon capture and improving the net capture efficiency of carbon dioxide.

SUMMARY OF THE INVENTION

In order to avoid one or more of the deficiencies described above present in the prior art, an object of the invention is to provide a new system for simplifying the process flow of carbon capture and improving the net capture efficiency of carbon dioxide, so as to improve the removal efficiency of heat stable salts while a relatively high recovery efficiency of organic amines is kept, as well as use a bipolar membrane electrodialysis method instead of a base addition and heat stripping process so that the energy consumption and the operational cost during the carbon dioxide capture are reduced.

To this end, in one aspect, the invention provides a regeneration system for a carbon-rich amine solution produced in the carbon dioxide capture from a mixed gas, which regeneration system is composed of a bipolar membrane electrodialysis apparatus and a carbon dioxide removal apparatus, wherein the bipolar membrane electrodialysis apparatus is composed of a bipolar membrane electrodialysis membrane stack fixed between an anode plate and a cathode plate, the anode plate and the cathode plate are respectively connected to a positive electrode and a negative electrode of a stabilized voltage or current power supply;

the bipolar membrane electrodialysis membrane stack is formed by alternately stacking two or more bipolar membranes and one or more cation and/or anion exchange membranes via flow channel separation nets and sealing gaskets, and the anion exchange layer of the bipolar membrane faces the anode plate to form an anode chamber therebetween, the cation exchange layer of the bipolar membrane faces the cathode plate to form an cathode chamber therebetween, one or more base chambers and acid chambers are formed between the bipolar membrane and the cation and/or anion exchange membrane, wherein the anode chamber and the cathode chamber are fluidly connected with an electrode solution storage tank, the base chamber is fluidly connected with a base solution storage tank, the acid chamber is fluidly connected with an acid solution storage tank and the carbon dioxide removal apparatus, and the solution in each of the anode chamber, the cathode chamber, and the base chamber is driven by a drive pump so that a circular flow is formed between the bipolar membrane electrodialysis apparatus and each respective storage tank;

the carbon dioxide removal apparatus is composed of one or more hollow fiber membrane contactors (also referred to as membrane reactors) connected in series or in parallel, the inlet of the carbon dioxide removal apparatus is fluidly connected with the outlet of the acid chamber of the bipolar membrane electrodialysis apparatus, the outlet of the carbon dioxide removal apparatus is fluidly connected with the acid solution storage tank, the solution in the acid chamber is circularly flowed by a drive pump among the bipolar membrane electrodialysis membrane stack, the carbon dioxide removal apparatus, and the acid solution storage tank, and carbon dioxide gas removed by the carbon dioxide removal apparatus is collected in a carbon dioxide storage tank.

In a preferred embodiment, the mixed gas is flue gas, and the regeneration system further comprises a pre-absorption apparatus positioned at upstream of the bipolar membrane electrodialysis apparatus for removing acid gases from the flue gas, and a carbon dioxide capturing apparatus positioned between the pre-absorption apparatus and the bipolar membrane electrodialysis apparatus, which contains a carbon dioxide capturing agent, wherein the carbon dioxide capturing agent is an amine-containing solution, and the amine-containing solution becomes a carbon-rich amine solution that contains heat stable salts after capturing carbon dioxide.

In a preferred embodiment, the bipolar membrane electrodialysis membrane stack is formed by alternately stacking a bipolar membrane, a cation exchange membrane, and an anion exchange membrane, wherein a feed chamber is formed between the cation exchange membrane and the anion exchange membrane, the feed chamber is fluidly connected with a feed liquid storage tank, and the feed liquid in the feed chamber is circularly flowed by a drive pump between the bipolar membrane electrodialysis apparatus and the feed liquid storage tank.

In a preferred embodiment, the regeneration system further comprises a pH sensor, a temperature sensor, and a conductivity sensor, which are provided at the outlet of each chamber, and one or more voltage or current transducers provided at both ends of the power supply, and the drive pumps, the sensors, and the transducers are each connected to a programmable logic controller (PLC) so as to achieve automatic controlling and data monitoring of the regeneration process.

In a preferred embodiment, the cation exchange membrane comprises a conventional cation exchange membrane, a mono-valent selective cation exchange membrane, a charged porous membrane, and an uncharged porous membrane; and the anion exchange membrane comprises a conventional anion exchange membrane, a mono-valent selective anion exchange membrane, a charged porous membrane, and an uncharged porous membrane.

In another aspect, the invention provides a method for regenerating a carbon-rich amine solution produced in carbon dioxide capture from a mixed gas with a regeneration system described above, comprising when the bipolar membrane electrodialysis membrane stack is formed by alternately assembling a bipolar membrane, a cation exchange membrane, and a anion exchange membrane, a carbon-rich amine solution containing heat stable salts to be regenerated is added to a feed liquid storage tank and pumped into a feed chamber of the bipolar membrane electrodialysis apparatus by a drive pump, and is circularly flowed by the drive pump; an acid solution is added to an acid solution storage tank and pumped into an acid chamber of the bipolar membrane electrodialysis apparatus by a drive pump, and is circularly flowed by the drive pump; a base solution is added to an base solution storage tank and pumped into a base chamber of the bipolar membrane electrodialysis apparatus by a drive pump, and is circularly flowed by the drive pump; and an electrolyte solution as an electrode solution is added to an electrode solution storage tank and pumped into electrode chambers of the bipolar membrane electrodialysis apparatus by a drive pump, and is circularly flowed in the anode chamber and the cathode chamber by the drive pump respectively;

when the bipolar membrane electrodialysis membrane stack is formed by alternately assembling a bipolar membrane and an anion exchange membrane, a carbon-rich amine solution containing heat stable salts to be regenerated is added to an base solution storage tank and pumped into a base chamber of the bipolar membrane electrodialysis apparatus by a drive pump, and is circularly flowed by the drive pump; an acid solution is added to an acid solution storage tank and pumped into an acid chamber of the bipolar membrane electrodialysis apparatus by a drive pump, and is circularly flowed by the drive pump; and an electrolyte solution as an electrode solution is added to an electrode solution storage tank and pumped into electrode chambers of the bipolar membrane electrodialysis apparatus by a drive pump, and is circularly flowed by the drive pump respectively;

when the bipolar membrane electrodialysis membrane stack is formed by alternately stacking a bipolar membrane and an cation exchange membrane, a carbon-rich amine solution containing heat stable salts to be regenerated is added to an acid solution storage tank and pumped into an acid chamber of the bipolar membrane electrodialysis apparatus by a drive pump, and is circularly flowed by the drive pump; an amine solution as a base solution is added to an base solution storage tank and pumped into a base chamber of the bipolar membrane electrodialysis apparatus by a drive pump, and is circularly flowed by the drive pump; and an electrolyte solution as an electrode solution is added to an electrode solution storage tank and pumped into electrode chambers of the bipolar membrane electrodialysis apparatus by a pump, and is circularly flowed in the anode chamber and the cathode chamber by a drive pump respectively;

after each circular flow is stable, a constant current or a constant voltage is applied to the bipolar membrane electrodialysis apparatus by a power supply to start the regeneration system so as to achieve regeneration of the carbon-rich amine solution.

In a preferred embodiment, the concentration of each of the acid solution, the base solution, and the electrode solution is 0.01-5 mol/L.

In a preferred embodiment, the carbon-rich amine solution comprises one or more of monoethanolamine (MEA), diethanolamine (DEA), triethanolamine (TEA), diisopropanolamine (DIPA), methyldiethanolamine (MDEA), diisopropylamine (DIPA), diglycolamine (DGA), ethylenediamine, piperazine, pyridine, glycinate, alaninate, leucinate, sarcosinate, phenylalaninate, tryptophanate, glutamate, lysinate, methioninate, and cystinate; and the heat stable salt in the carbon-rich amine solution is one or more of sulfate, nitrate, hydrochloride, formate, acetate, and oxalate salts of amine.

In a preferred embodiment, the acid solution is an aqueous solution of an inorganic acid or an organic acid; the base solution is an aqueous solution of an organic amine; and the electrode solution is an aqueous solution of one or more of sodium sulfate, potassium sulfate, lithium sulfate, sodium nitrate, potassium nitrate, lithium nitrate, sodium hydroxide, potassium hydroxide, and lithium hydroxide.

In a preferred embodiment, the mixed gas is flue gas, and the flue gas is pre-combustion gas or post-combustion exhaust gas from combustion of a fossil fuel or a biomass fuel.

Compared to the prior art, the advantageous effects of the invention include, but are not limited to, the following.

1. In this invention, a carbon-rich amine solution containing heat stable salts is treated by using a bipolar membrane electrodialysis electric acidification technique. Compared to a conventional process using a stripping unit and an organic amine treatment unit, regeneration of the carbon-rich amine solution may be achieved without addition of a base solution, meanwhile the heat stable salts are synergistically removed. By integrating two-unit operation into a single operation, the process is simplified and thus the investment cost and the subsequent maintenance cost are reduced.

2. In this invention, a bipolar membrane electrodialysis apparatus and a hollow fiber membrane apparatus are integrated and coupled, so that the mass transfer of carbon dioxide in different phases is enhanced and the separation efficiency of carbon dioxide is improved.

3. In this invention, the regeneration process of the carbon capturing agent is operated under a room temperature condition, so that the energy-intensive heating operation is avoided and the net capture efficiency of carbon dioxide is improved.

DESCRIPTION OF EMBODIMENTS

Figure 1:
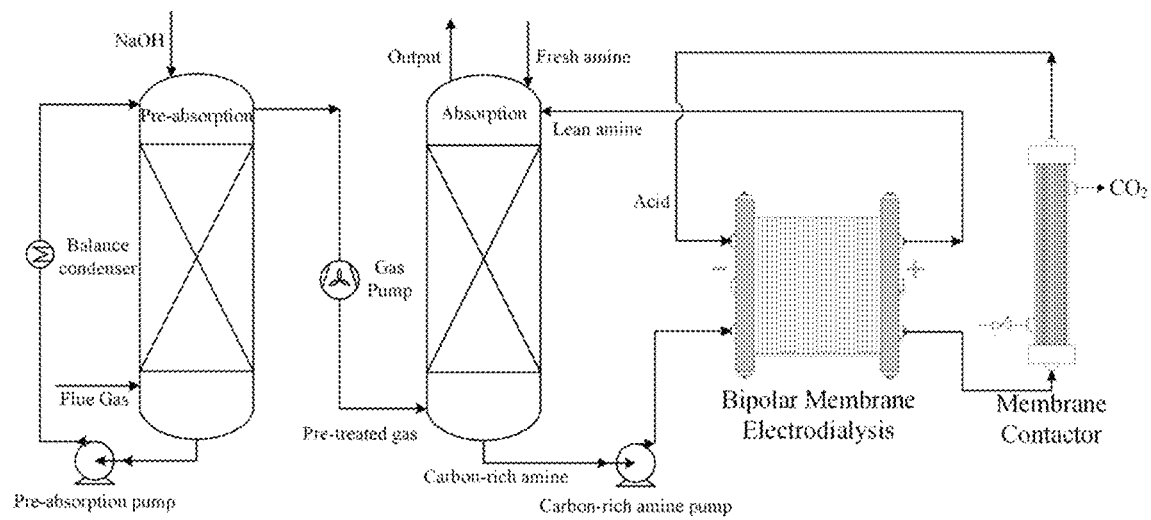
FIG. 1 is a schematic view of a regeneration system comprising a pre-absorption apparatus according to an embodiment of the invention.

In order to provide a new system for simplifying the process flow of carbon capture while improving the net capture efficiency of carbon dioxide, so as to improve the removal efficiency of heat stable salts while a relatively high recovery efficiency of organic amines is retained, meanwhile a bipolar membrane electrodialysis method is used in place of a base-adding and heat stripping process, so as to reduce the energy consumption in the carbon dioxide capture process, the inventors use bipolar membrane electrodialysis in place of conventional stripping and organic amine treatment units, introduce a carbon-rich amine solution carrying heat stable salts to a bipolar membrane electrodialysis membrane stack, and neutralize a protonated organic amine using hydroxyl ions dissociated from a bipolar membrane and convert the solution to a fresh organic amine solution, and then return the fresh organic amine solution obtained by regeneration to a carbon dioxide absorption tower for carbon dioxide capture. Acid instable carbonate or bicarbonate ions are bonded with protons dissociated from the bipolar membrane and thus converted to carbonic acid, and the dissolution equilibrium of carbonic acid is broken by using a carbon dioxide removal apparatus (composed of a hollow fiber membrane contactor) to release carbon dioxide from the feed liquid. With the drive effect of the electric field on the ions as well as the selection and separation effect of the membranes on different charged ions, heat stable anions are removed from the feed liquid. The above processes are occurred simultaneously in one bipolar membrane electrodialysis membrane stack so that a synergistic operation for the regeneration of a carbon-rich amine solution carrying heat stable salts and the removal of the heat stable salt is achieved, and two operation units are integrated into one step, so that the operations are simplified, the costs of investment and maintenance are reduced, and the recovery efficiency of organic amines is improved at the same time.

Particularly, the invention provides a regeneration system for a carbon-rich amine solution produced in carbon dioxide capture from a mixed gas, which regeneration system is composed of a bipolar membrane electrodialysis apparatus and a carbon dioxide removal apparatus.

In the regeneration system of the invention, the bipolar membrane electrodialysis apparatus is composed of a bipolar membrane electrodialysis membrane stack that is fixed between an anode plate and a cathode plate, the anode plate and the cathode plate are respectively connected to a positive electrode and a negative electrode of a stabilized voltage or current power supply.

In the regeneration system of the invention, the bipolar membrane electrodialysis membrane stack is formed by alternately stacking two or more bipolar membranes and one or more cation and/or anion exchange membranes via flow channel separation nets and sealing gaskets, and the anion exchange layer of the bipolar membrane faces the anode plate to form an anode chamber therebetween, the cation exchange layer of the bipolar membrane faces the cathode plate to form an cathode chamber therebetween, one or more base chambers and acid chambers are formed between the bipolar membrane and the cation and/or anion exchange membrane, wherein the anode chamber and the cathode chamber are fluidly connected with an electrode solution storage tank, the base chamber is fluidly connected with a base solution storage tank, the acid chamber is fluidly connected with an acid solution storage tank and the carbon dioxide removal apparatus, the solution in each of the anode chamber, the cathode chamber, and the base chamber is driven by a drive pump so that a circular flow is formed between the bipolar membrane electrodialysis apparatus and each respective storage tank.

In the regeneration system of the invention, the carbon dioxide removal apparatus is composed of one or more hollow fiber membrane contactors (or hollow fiber membrane modules) connected in series or in parallel, the inlet of the carbon dioxide removal apparatus is fluidly connected with the outlet of the acid chamber of the bipolar membrane electrodialysis apparatus, the outlet of the carbon dioxide removal apparatus is fluidly connected with the acid solution storage tank, the solution in the acid chamber is circularly flowed among the bipolar membrane electrodialysis membrane stack, the carbon dioxide removal apparatus, and the acid solution storage tank by a drive pump, and carbon dioxide gas removed by the carbon dioxide removal apparatus is collected in a carbon dioxide storage tank.

In the invention, a carbon-rich amine solution having heat stable salts is treated with a combined apparatus of a bipolar membrane electrodialysis apparatus and a carbon dioxide removal apparatus, the separate operations for conventional heat stripping and organic amine regeneration are avoided, the energy consumption of carbon capture is reduced, the process flow is simplified, and the overall net capture efficiency of carbon dioxide is improved.

Preferably, in the invention, the mixed gas is flue gas, and the regeneration system further comprises a pre-absorption apparatus positioned at upstream of the bipolar membrane electrodialysis apparatus for removing acid gases from the flue gas, and a carbon dioxide capturing apparatus positioned between the pre-absorption apparatus and the bipolar membrane electrodialysis apparatus, which contains a carbon dioxide capturing agent, wherein the carbon dioxide capturing agent is a fresh organic amine solution, and this organic amine solution becomes a carbon-rich amine solution containing heat stable salts after capturing carbon dioxide.

Preferably, in the invention, the bipolar membrane electrodialysis membrane stack is formed by alternately stacking a bipolar membrane, a cation exchange membrane, and an anion exchange membrane, wherein a feed chamber is formed between the cation exchange membrane and the anion exchange membrane, the feed chamber is fluidly connected with a feed liquid storage tank, and the feed liquid in the feed chamber is circularly flowed between the bipolar membrane electrodialysis apparatus and the feed liquid storage tank by a drive pump.

Preferably, in the invention, the regeneration system further comprises a pH sensor, a temperature sensor, and a conductivity sensor provided at the outlet of each chamber, and one or more voltage or current transducers provided at both ends of the power supply, and each of the drive pumps, the sensors, and the transducers is connected to a programmable logic controller (PLC) so that automatic control and data monitoring of the regeneration process is achieved.

Preferably, in the invention, the cation exchange membrane comprises a conventional cation exchange membrane, a mono-valent selective cation exchange membrane, a charged porous membrane, and uncharged porous membrane; and the anion exchange membrane comprises a conventional anion exchange membrane, a mono-valent selective anion exchange membranes, a charged porous membrane, and uncharged porous membrane. It is to be noted herein that, as can be understood by the person skilled in the art, a "conventional cation exchange membrane" and a "conventional anion exchange membrane" used herein refer to one type of cation exchange membranes and one type of anion exchange membranes known in the art respectively. Here, "conventional" is not an adjective and is not used to modify the "ion exchange membrane", but represents the type of a corresponding exchange membrane. Similarly, a "mono-valent selective cation exchange membrane" and a "mono-valent a selective anion exchange membrane" used herein refer to one type of cation exchange membranes and one type of anion exchange membranes known in the art respectively, instead of representing a mono-valent cation or anion exchange membrane respectively.

The invention also provides a method for regenerating a carbon-rich amine solution produced in carbon dioxide capture from a mixed gas with the regeneration system described above.

In the method of the invention, when the bipolar membrane electrodialysis membrane stack is formed by alternately stacking a bipolar membrane, a cation exchange membrane, and an anion exchange membrane, a carbon-rich amine solution containing heat stable salts to be regenerated is added to a feed liquid storage tank and pumped into a feed chamber of the bipolar membrane electrodialysis apparatus by a drive pump, and is circularly flowed by the drive pump; an acid solution is added to an acid solution storage tank and pumped into an acid chamber of the bipolar membrane electrodialysis apparatus by a drive pump, and is circularly flowed by the drive pump; a base solution is added to an base solution storage tank and pumped into a base chamber of the bipolar membrane electrodialysis apparatus by a drive pump, and is circularly flowed by the drive pump; and an electrolyte solution as an electrode solution is added to an electrode solution storage tank and pumped into electrode chambers of the bipolar membrane electrodialysis apparatus by a drive pump, and is circularly flowed in the anode chamber and the cathode chamber by the drive pump respectively.

In the method of the invention, when the bipolar membrane electrodialysis membrane stack is formed by alternately stacking a bipolar membrane and an anion exchange membrane, a carbon-rich amine solution containing heat stable salts to be regenerated is added to an base solution storage tank and pumped into a base chamber of the bipolar membrane electrodialysis apparatus by a drive pump, and is circularly flowed by the drive pump; an acid solution is added to an acid solution storage tank and pumped into an acid chamber of the bipolar membrane electrodialysis apparatus by a drive pump, and is circularly flowed by the drive pump; and an electrolyte solution as an electrode solution is added to an electrode solution storage tank and pumped into electrode chambers of the bipolar membrane electrodialysis apparatus by a drive pump, and is circularly flowed by the drive pump respectively.

In the method of the invention, when the bipolar membrane electrodialysis membrane stack is formed by alternately stacking a bipolar membrane and an cation exchange membrane, a carbon-rich amine solution containing heat stable salts to be regenerated is added to an acid solution storage tank and pumped into an acid chamber of the bipolar membrane electrodialysis apparatus by a drive pump, and is circularly flowed by the drive pump; a fresh organic amine solution as a base solution is added to an base solution storage tank and pumped into a base chamber of the bipolar membrane electrodialysis apparatus by a drive pump, and is circularly flowed by a drive pump; and an electrolyte solution as an electrode solution is added to an electrode solution storage tank and pumped into electrode chambers of the bipolar membrane electrodialysis apparatus by a drive pump, and is circularly flowed in the anode chamber and the cathode chamber by the drive pump respectively.

In the method of the invention, after each circular flow is stable, a constant current or a constant voltage is applied to the bipolar membrane electrodialysis apparatus by a power supply to start the regeneration system so as to achieve the regeneration of the carbon-rich amine solution.

Although it is not particularly limited, the concentration of the acid solution, the base solution, and the electrode solution used in the invention is preferably 0.01-5 mol/L respectively.

Preferably, in the invention, the carbon-rich amine solution may comprise one or more of monoethanolamine (MEA), diethanolamine (DEA), triethanolamine (TEA), diisopropanolamine (DIPA), methyldiethanolamine (MDEA), diisopropylamine (DIPA), diglycolamine (DGA), ethylenediamine, piperazine (PZ), pyridine, glycinate, alaninate, leucinate, sarcosinate, phenylalaninate, tryptophanate, glutamate, lysinate, methioninate, and cystinate.

Preferably, in the invention, the heat stable salt in the carbon-rich amine solution may be one or more of sulfate, nitrate, hydrochloride, formate, acetate, and oxalate of amine, as a carbon dioxide absorbent.

Preferably, in the invention, the acid solution is an aqueous solution of an inorganic acid or an organic acid; the base solution is an aqueous solution of an organic amine; and the electrode solution is an aqueous solution of one or more of sodium sulfate, potassium sulfate, lithium sulfate, sodium nitrate, potassium nitrate, lithium nitrate, sodium hydroxide, potassium hydroxide, and lithium hydroxide.

Preferably, in the invention, the mixed gas is flue gas, and the flue gas is pre-combustion gas or post-combustion exhaust gas from combustion of a fossil fuel or a biomass fuel.

In the invention, the drive pump used may be one or more of a diaphragm pump, a peristaltic pump, a submersible pump, a piston pump, and the like.

In the invention, there may be a single or several repeat unit(s) of "base chamber-feed chamber-acid chamber" or "base chamber-acid chamber" in the bipolar membrane electrodialysis membrane stack. As an example, a carbon-rich amine solution containing heat stable salts is treated with an electrodialysis apparatus having one repeat unit of "base chamber-feed chamber-acid chamber". A respective solution is introduced to a respective chamber in the bipolar membrane electrodialysis membrane stack, and water is dissociated at the bipolar membrane by applying current and generates hydroxyl ions and protons. A protonated organic amine in the feed chamber is migrated through the cation exchange membrane to the base chamber under the drive effect of the anode, and is bonded to hydroxyl ions dissociated from an adjacent bipolar membrane to obtain a neutral organic amine Heat stable anions such as carbonate, bicarbonate, sulfate, nitrate, chloride, formate, acetate, oxalate, and the like ions in the feed chamber are permeated through the anion exchange membrane under the drive effect of the cathode and are bonded to protons dissociated from an adjacent bipolar membrane in the acid chamber to obtain inorganic or organic acids such as carbonic acid, sulfuric acid nitric acid, hydrochloric acid, formic acid, acetic acid, oxalic acid, and the like. An acid solution in the acid chamber is circularly flowed in the hollow fiber membrane contactor, the dissolution equilibrium of carbonic acid is broken, carbon dioxide is continuously released from a hollow fiber membrane tube, and the carbon dioxide product obtained is recovered by a gas recovery apparatus. The neutral organic amine in the feed chamber is not moved during the electric field application and is retained in the feed chamber. As the current is continuously applied, the heat stable salts in the feed liquid are continuously removed, meanwhile the organic amine carbon is continuously regenerated and the carbon dioxide byproduct is continuously accumulated. In the invention, the operational principle of an electrodialysis apparatus having several repeat units of "base chamber-feed chamber-acid chamber" is the same as that of an apparatus having a single repeat unit. Additionally, in the invention, the operational principle of an electrodialysis apparatus having a single or several repeat units of "base chamber-acid chamber" is the same as that of an apparatus having a single repeat unit of "base chamber-feed chamber-acid chamber".

FIG. 1 is a schematic view of a regeneration system comprising a pre-absorption apparatus according to an embodiment of the invention. As shown in FIG. 1, the regeneration system of the invention for a carbon-rich amine solution produced in carbon dioxide capture from a mixed gas is composed of a bipolar membrane electrodialysis apparatus and a carbon dioxide removal apparatus (a hollow fiber membrane contactor as shown in the figure), wherein the bipolar membrane electrodialysis apparatus is composed of a bipolar membrane electrodialysis membrane stack fixed between an anode plate and a cathode plate, and the anode plate and the cathode plate are respectively connected to the positive electrode ("+") and the negative electrode ("−") of a stabilized voltage or current power supply. A pre-absorption apparatus positioned at upstream of this regeneration system comprises a pre-absorption tower and an absorption tower, wherein a mixed gas such as flue gas is introduced from the bottom of the pre-absorption tower, and acid gases such as $SO_X$, $NO_R$, HCl, HCN, and the like therein are absorbed by a NaOH solution introduced in the pre-absorption tower, and the pre-absorption process may be circularly performed by a pre-absorption circulation pump, and a balancing condenser may be used for cooling during circulation as needed. The pretreated flue gas after the treatment in the pre-absorption tower is pumped into a carbon dioxide absorption tower by a gas pump. A fresh amine solution such as an aqueous solution of monoethanolamine (MEA), diethanolamine (DEA), triethanolamine (TEA), diisopropanolamine (DIPA), methyldiethanolamine (MDEA), diisopropylamine (DIPA), diglycolamine (DGA), ethylenediamine, piperazine (PZ), pyridine, and the like as a carbon dioxide absorbent, is charged in the absorption tower. The temperature in the absorption tower is preferably 30 to 50° C. After the treatment in the absorption tower, exhaust gas may be discharged into an exhaust gas collection tank, and then is circulated to the pre-absorber or the absorption tower, or is discharged directly, according to actual situations. The fresh amine solution in the absorption tower after capturing carbon dioxide becomes a carbon-rich amine solution containing heat stable salts, which may be one or more of sulfate, nitrate, hydrochloride, formate, acetate, and oxalate of amine. This carbon-rich amine solution is discharged from the bottom of the absorption tower, and is entered into the bipolar membrane electrodialysis membrane stack from a feeding port of the bipolar membrane electrodialysis apparatus of the regeneration system of the invention through a carbon-rich amine solution circulation pump for regeneration treatment. An acid solution such as an aqueous solution of hydrochloric acid is introduced from an acid solution storage tank (not shown) into the bipolar membrane electrodialysis apparatus through an electric drive pump. A carbon-lean amine solution obtained after regeneration is discharged from the outlet of the bipolar membrane electrodialysis apparatus and is circularly introduced into the absorption tower described above so as to be used as an absorbent. $CO_2$ absorbed by the absorbent is entered into a carbon dioxide removal apparatus (i.e., a hollow fiber membrane contactor) after the treatment in the bipolar membrane electrodialysis apparatus, and thereby $CO_2$ is released. The released $CO_2$ is collected in a carbon dioxide storage tank (not shown). Meanwhile, the acid solution produced may be returned to the acid solution storage tank and circulated into the bipolar membrane electrodialysis apparatus through a circulation pump.

Figure 2:
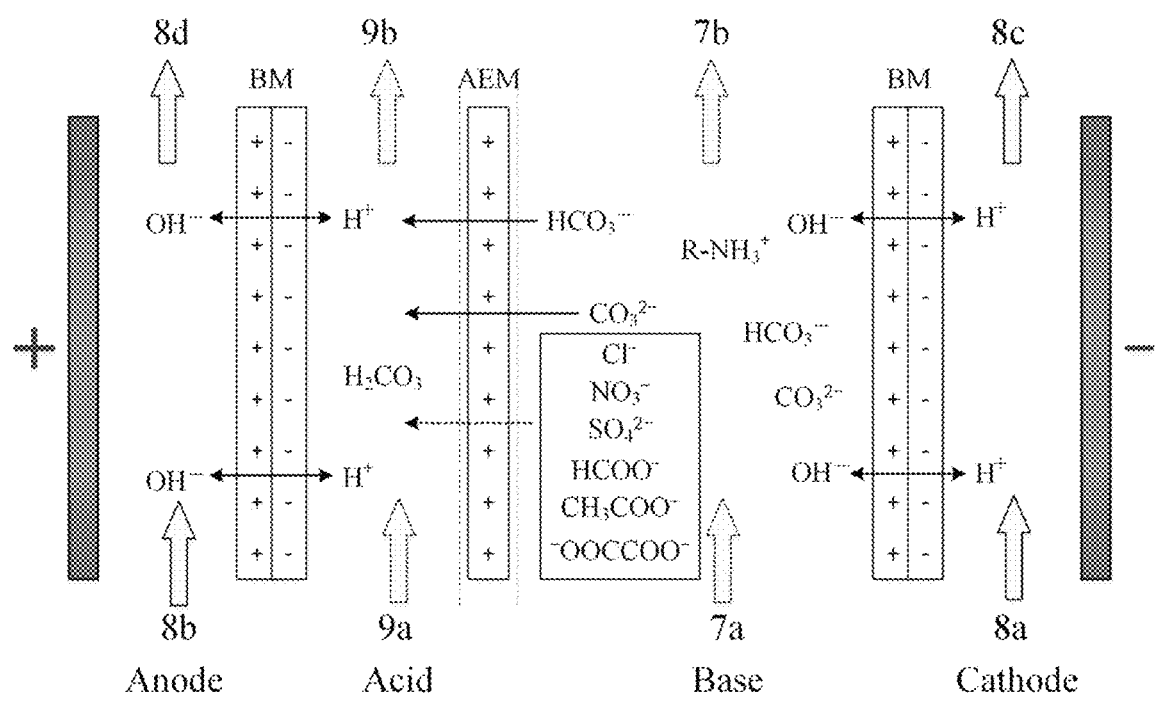
FIG. 2 is a schematic view of electrically acidified ion migration of a bipolar membrane electrodialysis membrane stack composed of a bipolar membrane and a conventional anion exchange membrane according to an embodiment of the invention.

FIG. 2 shows a schematic view of electrically acidified ion migration of a bipolar membrane electrodialysis membrane stack composed of a bipolar membrane and a conventional anion exchange membrane according to an embodiment of the invention, wherein only a bipolar membrane electrodialysis stack, which is composed of a bipolar membrane (BM), an anion exchange membrane (AEM) (a positively charged membrane), and a bipolar membrane (BM) alternately provided between electrode plates, is shown. That is, it comprises one repeat unit of "acid chamber-base chamber", whereas a bipolar membrane electrodialysis stack comprising several repeat units of "acid chamber-base chamber" may be obtained by repeating the arrangement of "bipolar membrane-anion exchange membrane" several times. In such a bipolar membrane electrodialysis apparatus, a carbon-rich amine solution containing heat stable salts to be regenerated is added to an base solution storage tank and pumped into a base chamber of the bipolar membrane electrodialysis apparatus by a drive pump, and is circularly flowed by the drive pump; an acid solution such as an aqueous solution of hydrochloric acid is added to an acid solution storage tank and pumped into an acid chamber of the bipolar membrane electrodialysis apparatus by a drive pump, and the solution discharged from the acid chamber is entered into a carbon dioxide removal apparatus and is circularly flowed by the drive pump; and an electrolyte solution such as an aqueous solution of sodium sulfate as an electrode solution is added to an electrode solution storage tank and pumped into the anode chamber and the cathode chamber of the bipolar membrane electrodialysis apparatus by a drive pump, and is circularly flowed by the drive pump respectively. After an electric field is applied to both ends of the electrodes, anions such as carbonate ions ($CO_3^{2-}$), bicarbonate ions ($HCO_3^-$), chloride ions ($Cl^-$), nitrate ions ($NO_3^-$), sulfate ions ($SO_4^{2-}$), formate ions ($HCOO^-$), acetate ions ($CH_3COO^-$), oxalate ions ($^-OOCCOO^-$), and the like in the base chamber will permeate through the anion exchange membrane and migrate to the acid chamber. Water is dissociated from the bipolar membrane under the action of the electric field. Hydroxyl ions ($OH^-$) dissociated from the bipolar membrane at a side of the base chamber is migrated to the base chamber and is bonded to a protonated organic amine ion ($R-NH_3^+$) to regenerate neutral organic amines. The organic amines obtained by regeneration are circulated to a carbon dioxide absorption tower. Protons ($H^+$) dissociated from a side of the acid chamber are bonded to the anions in the acid chamber to yield a mixed acid solution of carbonic acid, hydrochloric acid, nitric acid, sulfuric acid, formic acid, acetic acid, and oxalic acid. The acid solution is pumped out from the outlet of the bipolar membrane electrodialysis membrane stack and is flowed into the inlet of the carbon dioxide removal apparatus, the solution is circularly flowed inside a hollow fiber membrane, and carbon dioxide dissolved in the acid solution is diffused from the inside of the tube wall of the hollow fiber membrane to the outside so as to achieve carbon dioxide removal.

Figure 3:
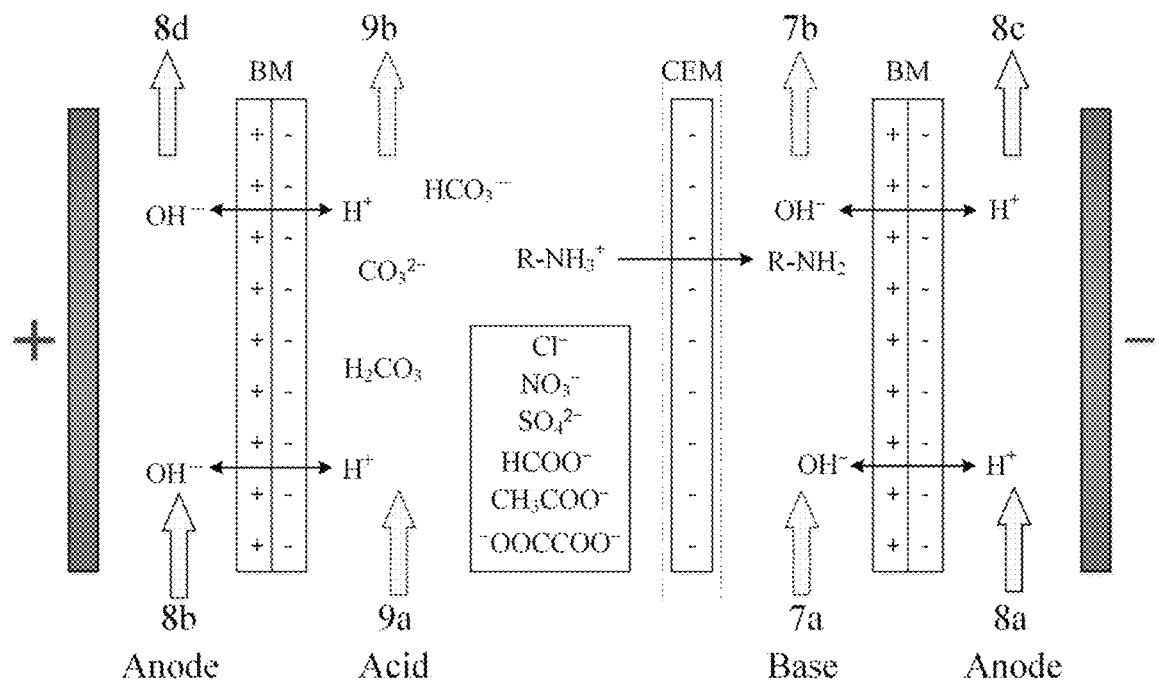
FIG. 3 is a schematic view of electrically acidified ion migration of a bipolar membrane electrodialysis membrane stack composed of a bipolar membrane and a conventional cation exchange membrane according to an embodiment of the invention.

FIG. 3 is a schematic view of electrically acidified ion migration of a bipolar membrane electrodialysis membrane stack composed of a bipolar membrane and a conventional cation exchange membrane according to an embodiment of the invention, wherein only a bipolar membrane electrodialysis stack, which is composed of a bipolar membrane (BM), an cation exchange membrane (CEM) (a negatively charged membrane), and a bipolar membrane (BM) alternately provided between electrode plates, is shown. That is, it comprises only one repeat unit of "acid chamber-base chamber", whereas a bipolar membrane electrodialysis stack comprising several repeat units of "acid chamber-base chamber" may be obtained by repeating the arrangement of "bipolar membrane-cation exchange membrane" several times. In such a bipolar membrane electrodialysis apparatus, a carbon-rich amine solution containing heat stable salts to be regenerated is added to an acid solution storage tank and pumped into an acid chamber of the bipolar membrane electrodialysis apparatus by a drive pump, and the solution discharged from the acid chamber is entered into a carbon dioxide removal apparatus and is circularly flowed by the drive pump; a fresh organic amine solution as a base solution is added to an base solution storage tank and pumped into a base chamber of the bipolar membrane electrodialysis apparatus by a drive pump, and is circularly flowed by a drive pump; and an electrolyte solution such as an aqueous solution of sodium sulfate as an electrode solution is added to an electrode solution storage tank and pumped into the anode chamber and the cathode chamber of the bipolar membrane electrodialysis apparatus by a drive pump, and is circularly flowed by the drive pump respectively. After an electric field is applied to both ends of the electrodes, cations such as protonated organic amines in the acid chamber will permeate through the cation exchange membrane and are migrated to the base chamber. Water is dissociated from the bipolar membrane under the action of the electric field. Hydroxyl ions dissociated from the bipolar membrane at a side of the base chamber are migrated to the base chamber and are bonded to protonated organic amine ions to regenerate neutral organic amines The organic amines obtained by regeneration are circulated to a carbon dioxide absorption tower. Protons dissociated from a side of the acid chamber are bonded to anions such as carbonate ions, bicarbonate ions, chloride ions, nitrate ions, sulfate ions, formate ions, acetate ions, oxalate ions, and the like in the acid chamber to obtain a mixed acid solution of carbonic acid, hydrochloric acid, nitric acid, sulfuric acid, formic acid, acetic acid, and oxalic acid. The acid solution is pumped out from the outlet of the bipolar membrane electrodialysis membrane stack and is flowed into the inlet of the carbon dioxide removal apparatus, the solution is circularly flowed in a hollow fiber membrane, and carbon dioxide dissolved in the acid solution is diffused from the inside of the tube wall of the hollow fiber membrane to the outside so as to achieve carbon dioxide removal.

Figure 4:
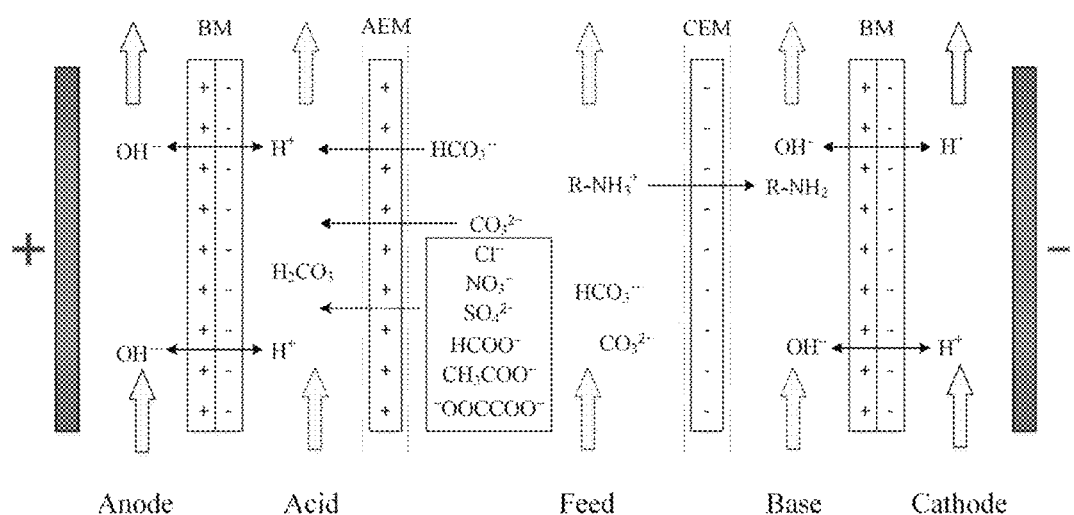
FIG. 4 is a schematic view of electrically acidified ion migration of a bipolar membrane electrodialysis membrane stack composed of a bipolar membrane, a conventional cation exchange membrane, and a conventional anion exchange membrane according to an embodiment of the invention.

FIG. 4 is a schematic view of electrically acidified ion migration of a bipolar membrane electrodialysis membrane stack composed of a bipolar membrane, a conventional cation exchange membrane, and a conventional anion exchange membrane according to an embodiment of the invention, wherein only a bipolar membrane electrodialysis stack, which is composed of a bipolar membrane (BM), an anion exchange membrane (AEM) (a positively charged membrane), a cation exchange membrane (CEM) (a negatively charged membrane), and a bipolar membrane (BM) alternately provided between electrode plates, is shown. That is, it comprises one repeat unit of "acid chamber-feed chamber-base chamber", whereas a bipolar membrane electrodialysis stack comprising several repeat units of "acid chamber-feed chamber-base chamber" may be obtained by repeating the arrangement of "bipolar membrane-anion exchange membrane-cation exchange membrane" several times. In such a bipolar membrane electrodialysis apparatus, a carbon-rich amine solution containing heat stable salts to be regenerated is added to a feed liquid storage tank and pumped into a feed chamber of the bipolar membrane electrodialysis apparatus by a drive pump, and is circularly flowed by the drive pump; an acid solution such as an aqueous solution of hydrochloric acid is added to an acid solution storage tank and pumped into an acid chamber of the bipolar membrane electrodialysis apparatus by a drive pump, and the solution discharged from the acid chamber is entered into a carbon dioxide removal apparatus and is circularly flowed by the drive pump; a fresh organic amine solution as a base solution is added to an base solution storage tank and pumped into a base chamber of the bipolar membrane electrodialysis apparatus by a drive pump, and is circularly flowed by the drive pump; and an electrolyte solution as an electrode solution is added to an electrode solution storage tank and pumped into the anode chamber and the cathode chamber of the bipolar membrane electrodialysis apparatus by a drive pump, and is circularly flowed by the drive pump respectively. After an electric field is applied to both ends of the electrodes, cations such as protonated organic amines in the feed chamber will permeate through the cation exchange membrane and are migrated to the base chamber, and anions such as carbonate ions, bicarbonate ions, chloride ions, nitrate ions, sulfate ions, formate ions, acetate ions, oxalate ions, and the like in the feed chamber will permeate through the anion exchange membrane and are migrated to the acid chamber. Water is dissociated from the bipolar membrane under the action of the electric field. Hydroxyl ions dissociated from the bipolar membrane at a side of the base chamber are migrated to the base chamber and are bonded to protonated organic amine ions to regenerate neutral organic amines. The organic amines obtained by regeneration are circulated to a carbon dioxide absorption tower. Protons dissociated from a side of the acid chamber are bonded to anions such as carbonate ions, bicarbonate ions, chloride ions, nitrate ions, sulfate ions, formate ions, acetate ions, oxalate ions, and the like in the acid chamber to obtain a mixed acid solution of carbonic acid, hydrochloric acid, nitric acid, sulfuric acid, formic acid, acetic acid, and oxalic acid. The acid solution is pumped out from the outlet of the bipolar membrane electrodialysis membrane stack and is flowed into the inlet of the carbon dioxide removal apparatus, the solution is circularly flowed in a hollow fiber membrane, and carbon dioxide dissolved in the acid solution is diffused from the inside of the tube wall of the hollow fiber membrane to the outside so as to achieve carbon dioxide removal.

Figure 5:
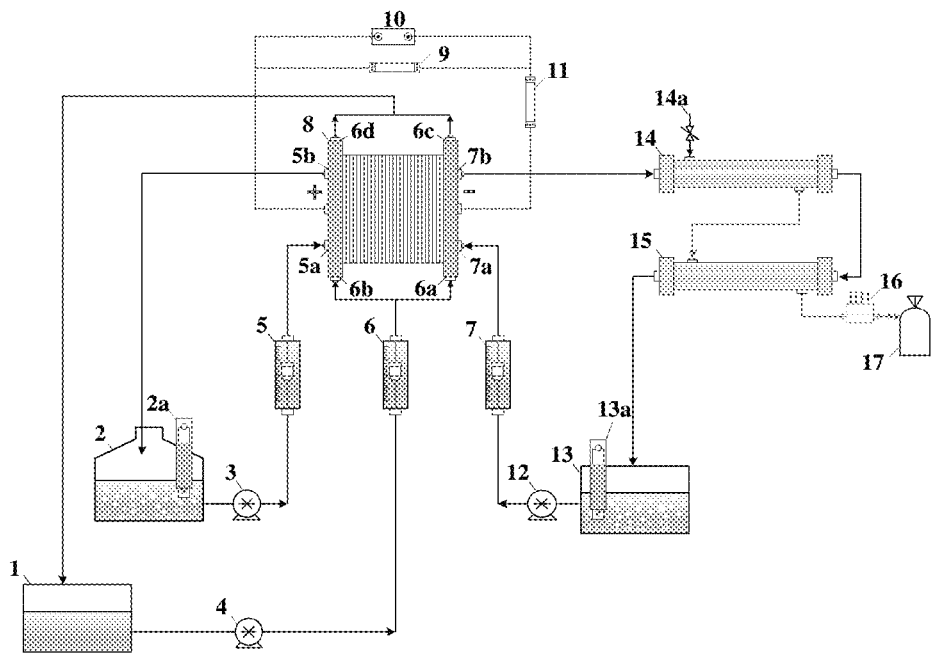
FIG. 5 is a bipolar membrane electrodialysis regeneration system for carbon-rich amine solution regeneration and heat stable salt removal according to an embodiment of the invention.

More particularly, FIG. 5 is a specific flow chart of a bipolar membrane electrodialysis regeneration system for carbon-rich amine solution regeneration according to an embodiment of the invention, wherein a bipolar membrane electrodialysis membrane stack 8 of a bipolar membrane electrodialysis apparatus is connected to a direct-current current-stabilized and voltage-stabilized power supply 10 via a voltage transducer 9 and a current transducer 11; an electrode solution in an electrode solution storage tank 1 is entered into an anode chamber and a cathode chamber of the bipolar membrane electrodialysis apparatus from a cathode solution inlet 6a and an anode solution inlet 6b respectively through an electrode solution drive pump 4 and an electrode solution flowmeter 6, and is flowed back to the electrode solution storage tank 1 from a cathode solution outlet 6c and an anode solution outlet 6d respectively after electrodialysis treatment; a base solution in a base solution storage tank 2 is entered into a base chamber of the bipolar membrane electrodialysis apparatus from a base solution inlet 5a of the bipolar membrane electrodialysis apparatus through a base solution drive pump 3 and a base solution flowmeter 5, and is flowed back to the base solution storage tank 2 from a base solution outlet 5b after electrodialysis treatment, wherein the base solution storage tank 2 is provided with a base solution sensor 2a, for example, for detecting the liquid level, the conductivity, and the pH of the base solution; and an acid solution in an acid solution storage tank 13 is entered into an acid chamber of the bipolar membrane electrodialysis apparatus from an acid solution inlet 7a of the bipolar membrane electrodialysis apparatus through an acid solution drive pump 12 and an acid solution flowmeter 7, and is flowed from an acid solution outlet 7b to a carbon dioxide removal apparatus composed of hollow fiber membrane contactors 14 and 15 connected in series after electrodialysis treatment, wherein the hollow fiber membrane contactor 14 is provided with a cut-off valve 14a, the acid solution after the treatment in the carbon dioxide removal apparatus is returned to the acid solution storage tank 13 from the hollow fiber membrane contactor 15, and the flow rate of removed $CO_2$ gas may be monitored by a gas mass flow transducer 16 online and is collected in a carbon dioxide storage tank 17.

EXAMPLES

In order to further illustrate the invention, the invention is described in detail below in conjunction with Examples. It is to be understood by the person skilled in the art that these Example are not intended to limit the scope of the invention.

In the Examples described below, all of the materials, apparatuses, agents, and the like used may be commercially available, unless specially stated, wherein all of drive pumps used are commercially available diaphragm pumps.

Example 1

In the regeneration system for regenerating a carbon-rich amine solution carrying heat stable salts used in this Example, a bipolar membrane electrodialysis apparatus was composed of a bipolar membrane electrodialysis membrane stack fixed between an anode plate and a cathode plate together with a carbon dioxide removal apparatus, wherein the bipolar membrane electrodialysis membrane stack, as shown in FIG. 2, was formed by alternately stacking bipolar membranes and anion exchange membranes, and then inserting flow channel separation nets and sealing gaskets, and thirteen bipolar membranes (Neosepta BP-1, purchased from ASTOM Corporation, Japan) and twelve anion exchange membranes (Neosepta AMX, purchased from ASTOM Corporation, Japan) were used in total, thereby 12 repeat units of "base chamber-acid chamber" were formed in the bipolar membrane electrodialysis membrane stack. The carbon dioxide removal apparatus was composed of two hollow fiber membrane contactors having an efficient area of 0.5 m² connected in series. The acid solution was 1.0 mol/L HCl solution; the base solution was 1 mol/L monoethanolamine solution; and the direct-current power supply was used to apply a constant current of 1 A to the bipolar membrane electrodialysis membrane stack. Specific membrane property parameters of the bipolar membrane and the anion exchange membrane were as shown in Table 1, the efficient area of a single membrane or a single electrode of the membrane stack was 84 cm².

TABLE 1

| Type of membrane | Thickness (μm) | Capacity of ion exchange (meq · g⁻¹) | Surface resistance (Ω · cm²) | Water content (%) | Migration number (%) |
|---|---|---|---|---|---|
| Neosepta AMX | 134 | 1.25 | 2.35 | 16 | 91 |
| Neosepta BP-1 | 200-300 | — | — | 23 | >98 |

The regeneration process with the regeneration system described above for a carbon-rich amine solution having heat stable salts was as follows.

A fresh monoethanolamine solution was converted to a carbon-enriched monoethanolamine solution via the pre-absorption and carbon dioxide absorption system. 1 L of the carbon-enriched monoethanolamine solution was taken and charged in the base solution storage tank and was used as a base solution; 1 L of HCl solution having a concentration of 1 mol/L was taken and charged in an acid solution storage tank and was used as an acid solution; and 0.5 L of a sodium sulfate solution having a mass concentration of 3% was taken and charged in an electrode solution storage tank and was used as an electrode solution.

Next, the carbon-enriched monoethanolamine solution was circularly flowed between the base chamber of the bipolar membrane electrodialysis membrane stack and the base solution storage tank by a diaphragm pump; the acid solution was circularly flowed between the acid chamber of the bipolar membrane electrodialysis membrane stack and the acid solution storage tank by a diaphragm pump; and the electrode solution was circularly flowed between the anode chamber and the electrode solution storage tank and between the cathode chamber and the electrode solution storage tank by a diaphragm pump, respectively.

After circular flow for about 10 minutes, the application of a direct-current power supply was started to apply a constant current of 1 A to perform electrodialysis operation. After an electric field was applied to both ends of the electrodes, carbonate ions, bicarbonate ions, sulfate ions, and the like in the base chamber transport through the anion exchange membrane and migrated to the acid chamber. Water was dissociated from the bipolar membrane under the action of the electric field. Hydroxyl ions dissociated from the bipolar membrane at a side of the base chamber migrated to the base chamber and were bonded to protonated monoethanolamine ions to regenerate neutral monoethanolamine. The monoethanolamine obtained by regeneration was circulated to a carbon dioxide absorption tower. The protons dissociated from a side of the acid chamber were bonded to the anions in the acid chamber to obtain a mixed acid solution of carbonic acid, sulfuric acid, and hydrochloric acid. The acid solution was pumped out from the outlet of the bipolar membrane electrodialysis membrane stack and flowed into the carbon dioxide removal apparatus. The acid solution was circularly flowed in the hollow fiber membrane, and carbon dioxide dissolved in the acid solution was diffused from the inside of the tube wall of the hollow fiber membrane to outside so as to achieve carbon dioxide removal.

In the experiment, the changes in the voltage and current at both ends of the bipolar membrane electrodialysis membrane stack, as well as in the conductivity and pH of the acid chamber and the base chamber were monitored online by a voltage transducer, a current transducer, a conductivity meter, and a pH meter. The ion distribution in the carbon-enriched monoethanolamine solution was analyzed based on the change in pH during the experiment, the desalination ratio of the carbon-enriched monoethanolamine solution was analyzed based on the conductivity during the experiment, and the energy consumption during the experiment was analyzed based on the change in voltage. The flow rate of carbon dioxide gas released from the hollow fiber membrane contactor was monitored by a gas mass flow transducer, and the results were shown by "monoethanolamine-1A (MEA-1A)" in FIG. 6. The concentrations of sulfate ions in the acid chamber at the beginning and end of the experiment were analyzed by using inductively coupled plasma emission spectrometer, and the results were as shown by "monoethanolamine-1A (MEA-1A)" in FIG. 7.

Example 2

Figure 6:
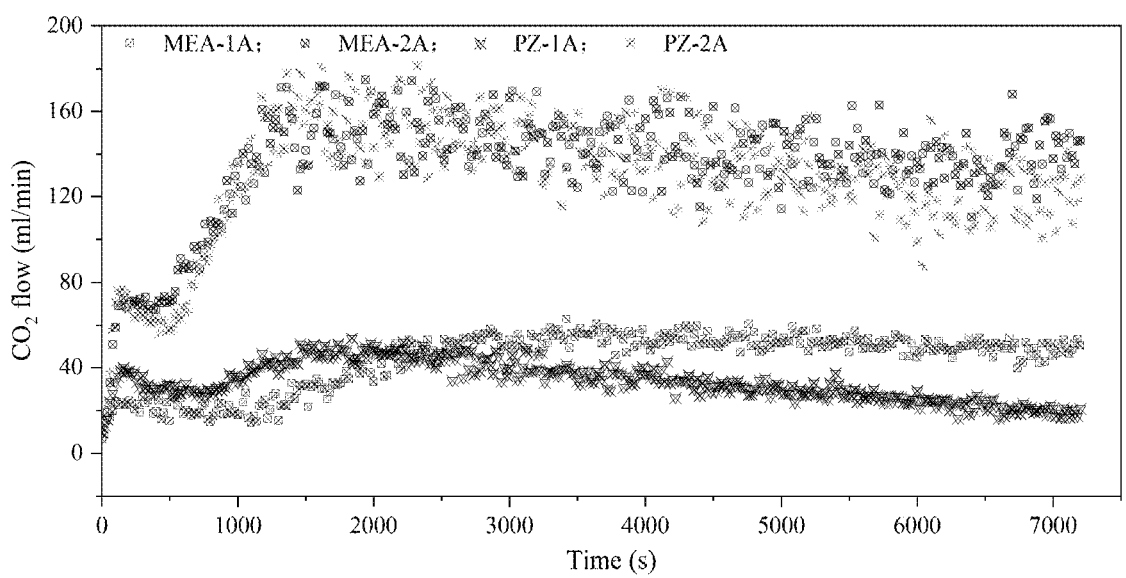
FIG. 6 is a schematic view of changes in release rate of carbon dioxide gas over time in Examples 1, 2, 3, and 4 according to the invention.
Figure 7:
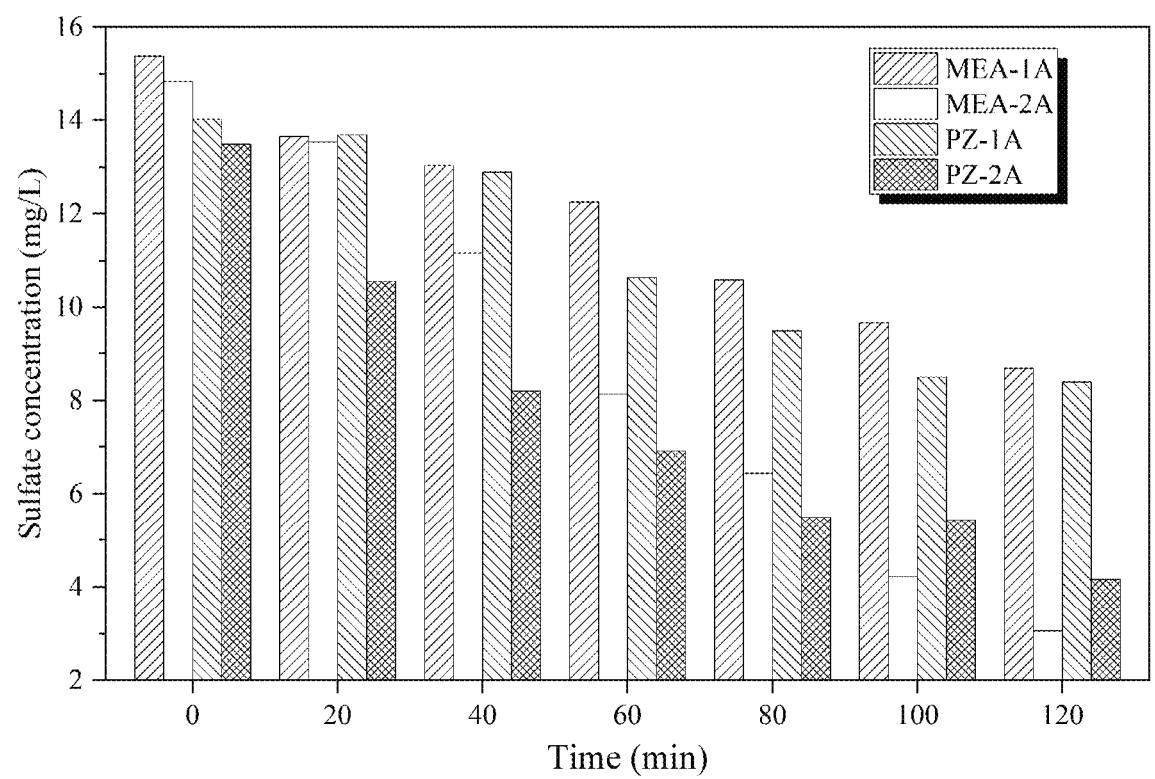
FIG. 7 is a schematic view of changes in heat stable sulfate over time in Examples 1, 2, 3, and 4 according to the invention.

The specific operation procedure was same as that in Example 1, except that a constant current of 2 A was applied to the bipolar membrane electrodialysis membrane stack instead of a constant current of 1 A, and the results could be seen from the results shown by "monoethanolamine-2A (MEA-2A)" in FIG. 6 and FIG. 7.

Example 3

The specific operation procedure was same as that in Example 1, except that a 1 mol/L aqueous piperazine solution was used as the base solution instead of a 1 mol/L monoethanolamine solution, and the results could be seen from the results shown by "piperazine-1A (PZ-1A)" in FIG. 6 and FIG. 7.

Example 4

The specific operation procedure was same as that in Example 1, except that a 1 mol/L aqueous piperazine solution was as the base solution instead of a 1 mol/L monoethanolamine solution and a constant current of 2 A was applied to the bipolar membrane electrodialysis membrane stack instead of a constant current of 1 A, and the results could be seen from the results shown by "piperazine-2A (PZ-2A)" in FIG. 6 and FIG. 7.

It could be seen from FIG. 6 and FIG. 7 that carbon dioxide was steadily released from the hollow fiber membrane contactor after a current was applied, and the release rate thereof was steadily increased at first and then reached a stable state. Furthermore, where the operation current density and the operation time were same, the release rate of carbon dioxide was substantially same for the systems of monoethanolamine and piperazine. Where the operation time was same, the release rate of carbon dioxide at a higher current density was larger than that at a lower current density for the same carbon capture system of organic amines. It was demonstrated that carbon dioxide captured in the carbon-rich amine solution was continuously separated and the carbon-rich amine solution was continuously converted to a carbon-lean amine solution, which could be reused by the carbon dioxide trapping apparatus. Meanwhile, as carbon dioxide was continuously removed and the carbon-rich amine solution was continuously regenerated, the concentration of sulfate salts in the carbon-rich amine solution was continuously decreased. For the carbon capture systems of monoethanolamine and piperazine, with the operations at a current of 1 A and 2 A, the removal efficiency of heat stable salts at the end of the experiment could be up to 45%, 42%, 79%, and 70%, respectively. Furthermore, where the operation current density and the operation time were same, the heat stable salt removal rate of MEA was higher than that of a PZ system. Where the operation time was same, the heat stable salt removal efficiency at a higher current density was larger than that at a lower current density for the same carbon capture system of organic amines. It was demonstrated that, as sulfate-type of heat stable salts were continuously removed while the carbon-rich amine solution was continuously converted to a carbon-lean amine solution, the carbon-lean amine solution was also converted to a fresh amine solution online, which was returned to the carbon dioxide trapping apparatus.

Example 5

The specific operation procedure was same as that in Example 1, except that the bipolar membrane electrodialysis membrane stack, as shown in FIG. 3, was formed by alternately stacking bipolar membranes and cation exchange membranes, and then inserting flow channel separation nets and sealing gaskets, and thirteen bipolar membranes (Neosepta BP-1, purchased from ASTOM Corporation, Japan) and twelve cation exchange membranes (Neosepta CMX, purchased from ASTOM Corporation, Japan) were used in total, thereby 12 repeat units of "base chamber-acid chamber" were formed in the bipolar membrane electrodialysis membrane stack. The carbon-enriched monoethanolamine solution to be regenerated was added to the acid solution storage tank and pumped into the acid chamber of the bipolar membrane electrodialysis apparatus by a diaphragm pump, and 1 mol/L fresh monoethanolamine solution as a base solution was added to the base solution storage tank and pumped into the base chamber of the bipolar membrane electrodialysis apparatus by a diaphragm pump; and a direct-current power supply was used to apply a constant current of 1 A to the bipolar membrane electrodialysis membrane stack. The specific membrane property parameters of the bipolar membrane and the cation exchange membranes were shown in Table 2, and the efficient area of a single membrane or a single electrode of the membrane stack was 84 cm².

TABLE 2

| Type of membrane | Thickness (µm) | Capacity of ion exchange (meq · g⁻¹) | Surface resistance (Ω · cm²) | Water content (%) | Migration number (%) |
|---|---|---|---|---|---|
| Neosepta CMX | 164 | 1.62 | 2.91 | 18 | 98 |
| Neosepta BP-1 | 200-300 | — | — | 23 | >98 |

With the operation process same as that in Example 1, this regeneration system was used for the regeneration of a carbon-rich amine solution having heat stable salts, and the results similar to those of Example 1 could be obtained.

Example 6

The specific operation procedure was same as that in Example 1, except that the bipolar membrane electrodialysis membrane stack, as shown in FIG. 4, was formed by alternately stacking bipolar membranes, cation exchange membranes, and anion exchange membranes, and then inserting flow channel separation nets and sealing gaskets, and thirteen bipolar membranes (Neosepta BP-1, purchased from ASTOM Corporation, Japan), twelve anion exchange membranes (Neosepta AMX, purchased from ASTOM Corporation, Japan), and twelve cation exchange membranes (Neosepta CMX, purchased from ASTOM Corporation, Japan) were used in total, thereby 12 repeat units of "base chamber-feed chamber-acid chamber" were formed in the bipolar membrane electrodialysis membrane stack. The carbon-enriched monoethanolamine solution to be regenerated was added to the feed liquid storage tank and pumped into the feed chamber of the bipolar membrane electrodialysis apparatus by a diaphragm pump so that a circular flow was formed therebetween, 1.0 mol/L HCl solution was added to the acid solution storage tank and pumped into the acid chamber of the bipolar membrane electrodialysis apparatus by a diaphragm pump, and 1 mol/L fresh monoethanolamine solution as a base solution was added to the base solution storage tank and pumped into the base chamber of the bipolar membrane electrodialysis apparatus by a diaphragm pump; and a direct-current power supply was used to apply a constant current of 1 A to the bipolar membrane electrodialysis membrane stack. The specific membrane property parameters of the bipolar membrane and the anion exchange membrane were shown in Table 3, and the efficient area of a single membrane or a single electrode of the membrane stack was 84 cm².

TABLE 3

| Type of membrane | Thickness (µm) | Capacity of ion exchange (meq · g⁻¹) | Surface resistance (Ω · cm²) | Water content (%) | Migration number (%) |
|---|---|---|---|---|---|
| Neosepta CMX | 164 | 1.62 | 2.91 | 18 | 98 |
| Neosepta AMX | 134 | 1.25 | 2.35 | 16 | 91 |
| Neosepta BP-1 | 200-300 | — | — | 23 | >98 |

With an operation process similar to that in Example 1, this regeneration system was used for the regeneration of a carbon-rich amine solution having heat stable salts, and the results similar to those of Example 1 could be obtained.

Although specific embodiments of the invention have been described in detail, the person skilled in the art will understand that various modifications and substitutions may be made to those details according to all teachings which have been already disclosed. All of these changes are within the scope protected by the invention. The entire scope of the invention is presented by appended claims and equivalents thereof.

What is claimed is:

1. A regeneration system for a carbon-rich amine solution produced in carbon dioxide capture from a mixed gas, which comprises a bipolar membrane electrodialysis apparatus and a carbon dioxide removal apparatus, wherein
    the bipolar membrane electrodialysis apparatus comprises a bipolar membrane electrodialysis membrane stack fixed between an anode plate and a cathode plate, and the anode plate and the cathode plate are respectively connected to a positive electrode and a negative electrode of a stabilized voltage or current power supply;
    the bipolar membrane electrodialysis membrane stack is formed by sequentially stacking a first bipolar membrane, one cation exchange membrane, one anion exchange membrane, and a second bipolar membrane, and the anion exchange layer of the first bipolar membrane faces the anode plate to form an anode chamber between the anion exchange layer of the first bipolar membrane and the anode plate, the cation exchange layer of the second bipolar membrane faces the cathode plate to form a cathode chamber between the cation exchange layer of the second bipolar membrane and the cathode plate, one base chamber is formed between the first bipolar membrane and the cation exchange membrane, one acid chamber is formed between the second bipolar membrane and the anion exchange membrane, wherein the anode chamber and the cathode chamber are fluidly connected with an electrode solution storage tank, the base chamber is fluidly connected with a base solution storage tank, the acid chamber is fluidly connected with an acid solution storage tank and the carbon dioxide removal apparatus, and the solution in each of the anode chamber, the cathode chamber, and the base chamber is driven by a drive pump so that a circular flow is formed between the bipolar membrane electrodialysis apparatus and each respective storage tank;

the carbon dioxide removal apparatus comprises one or more hollow fiber membrane contactors connected in series or in parallel, and the carbon dioxide removal apparatus comprises an inlet and an outlet, the inlet of the carbon dioxide removal apparatus is fluidly connected with an outlet of the acid chamber of the bipolar membrane electrodialysis apparatus, the outlet of the carbon dioxide removal apparatus is fluidly connected with the acid solution storage tank, the solution in the acid chamber is circularly flowed among the bipolar membrane electrodialysis membrane stack by a drive pump, the carbon dioxide removal apparatus and the acid solution storage tank, and carbon dioxide gas removed by the carbon dioxide removal apparatus is collected in a carbon dioxide storage tank, wherein a feed chamber is formed between the cation exchange membrane and the anion exchange membrane, the feed chamber is fluidly connected with a feed liquid storage tank, and a carbon-rich amine solution in the feed chamber is circularly flowed between the bipolar membrane electrodialysis apparatus and the feed liquid storage tank by a drive pump.

2. The regeneration system according to claim 1, wherein the mixed gas is flue gas, and the regeneration system further comprises a pre-absorption apparatus positioned at upstream of the bipolar membrane electrodialysis apparatus for removing acid gases from the flue gas, and a carbon dioxide capturing apparatus positioned between the pre-absorption apparatus and the bipolar membrane electrodialysis apparatus that contains a carbon dioxide capturing agent, wherein the carbon dioxide capturing agent is an amine-containing solution, and the amine-containing solution becomes a carbon-rich amine solution containing heat stable salts after capturing carbon dioxide.

3. The regeneration system according to claim 1, wherein the regeneration system further comprises a pH sensor, a temperature sensor, and a conductivity sensor, which are provided at the outlet of the acid chamber and at an outlet of the base chamber respectively, and one or more voltage or current transducers provided at both ends of the power supply.

4. The regeneration system according to claim 1, wherein the cation exchange membrane comprises a conventional cation exchange membrane, a mono-valent selective cation exchange membrane, a charged porous membrane, or an uncharged porous membrane; and the anion exchange membrane comprises a conventional anion exchange membrane, a mono-valent selective anion exchange membranes, a charged porous membrane, or an uncharged porous membrane.

* * * * *